March 7, 1967            L. KOVACS            3,308,222
SHEET EXTRUSION DIE
Filed Aug. 19, 1964            2 Sheets-Sheet 1
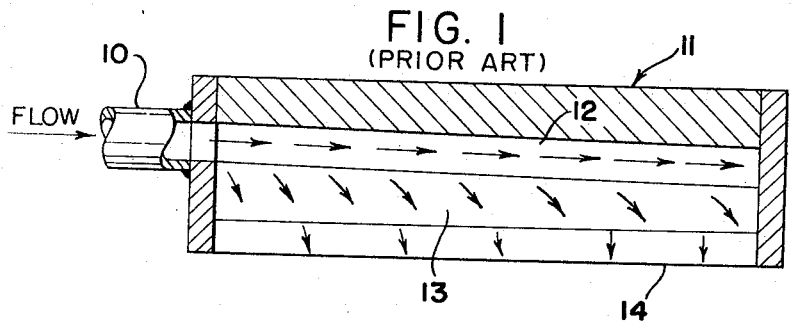
FIG. 1 (PRIOR ART)
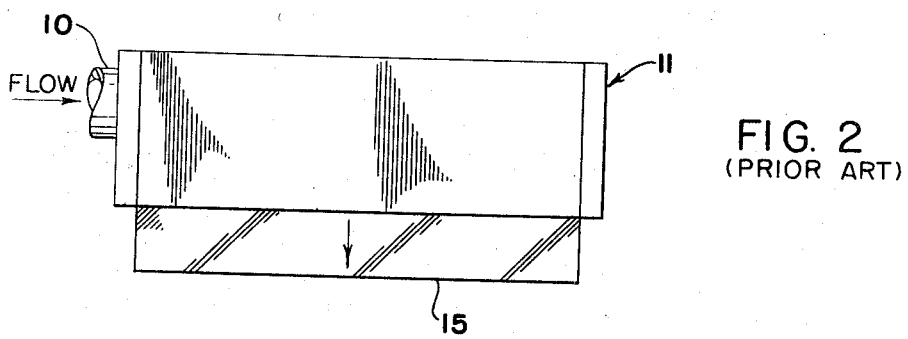
FIG. 2 (PRIOR ART)
FIG. 3 (PRIOR ART)
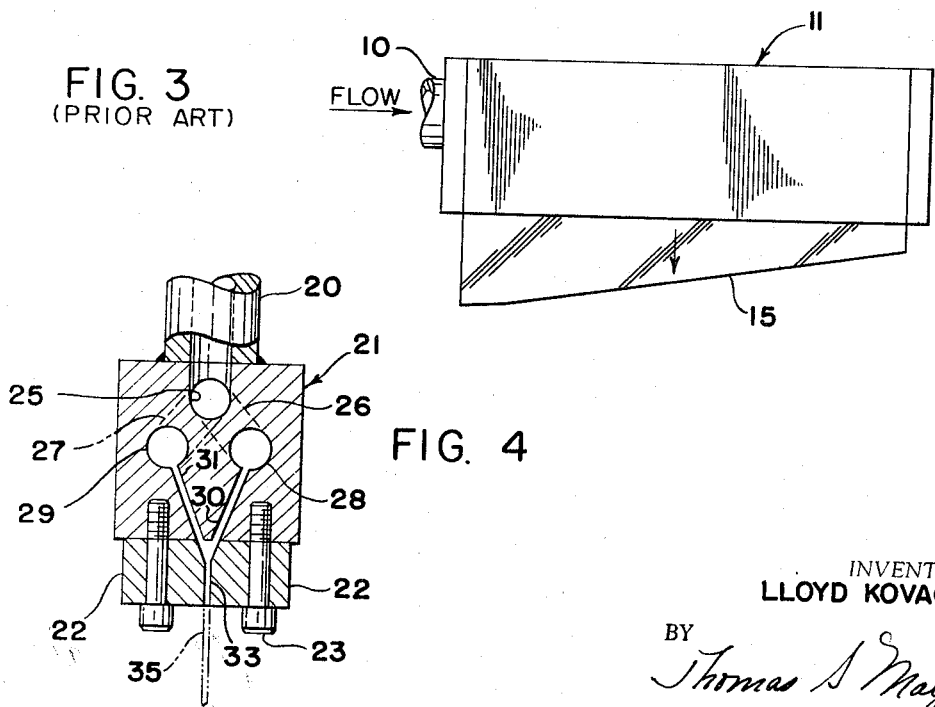
FIG. 4
INVENTOR.
LLOYD KOVACS
BY
Thomas S. Mayner
ATTORNEY

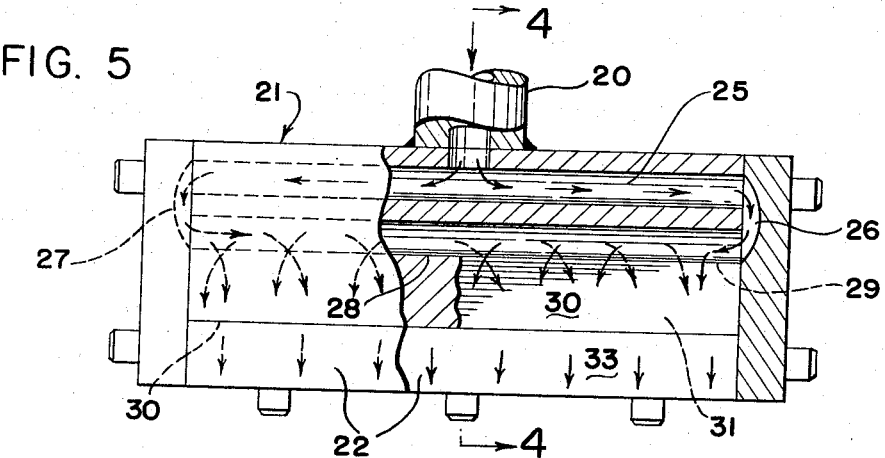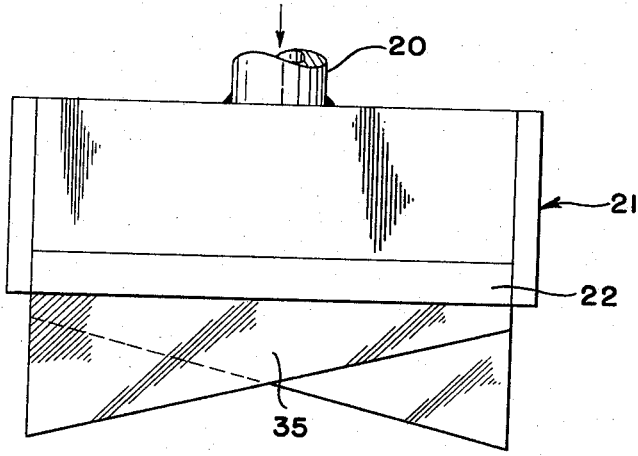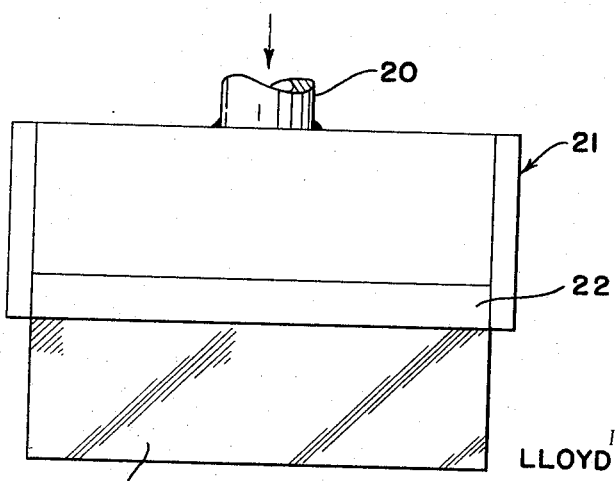

United States Patent Office 3,308,222
Patented Mar. 7, 1967

3,308,222
SHEET EXTRUSION DIE
Lloyd Kovacs, Somerset, N.J., assignor to Midland-Ross Corporation, Cleveland, Ohio, a corporation of Ohio
Filed Aug. 19, 1964, Ser. No. 390,602
3 Claims. (Cl. 264—176)

This invention relates to extrusion dies and, more particularly, to dies for the extrusion of plastic materials in sheet form.

It is desirable and quite important that dies extruding plastic sheet discharge such sheet forming material evenly throughout the width of the extruding die so that the sheet has uniform and even characteristics throughout its width. Dies have been manufactured with extreme care to offset the rheological characteristics of thermoplastic material to provide for uniformity and various designs have been incorporated into the dies. Incorporated design is quite specific and narrow in a sheet extrusion die that is used in the manufacture of thermoplastic sheet, even where the plastic material is additionally metered by a restriction prior to the die lips to regulate an even outflow of the plastic material.

The means used for metering adjustment of flow of plastic through a die is commonly called a "choker bar." It is a flow regulating bar adjustably positioned within the die to provide for the necessary back pressure so that plastic material flowing through the manifold passages is finally regulated prior to its extrusion through the die lips, flowing therefrom at a widthwise uniform rate. Such sheet extruding dies provide for but a narrow corrective range in cross-sectional dimensional changes of the extruded plastic sheet. Obviously, where the extrusion rate needs changing, the position of the choker bar has to be altered as well as the position of the die lips and it becomes a rather sensitive and difficult operation since any change from a set of predetermined conditions is a tedious, careful and time consuming operation. Of course, if plastic materials did not have the particular flow characteristics which make them difficult to handle, simply designed dies could be used.

It has been found that where a die has been designed for a set group of conditions based on the plastic material to be extruded into sheet, a change in the extruding conditions alters the set die characteristics and the issuing plastic sheet will have an uneven thickness across its width. Upon an increase in flow, pressure has been increased so the sheet will naturally be thicker or heavier at the closest extrusion point in the die, gradually altering to the far end of the die. It is the purpose of this invention to provide a die for the extrusion of sheet where compensating means such as choker bars are eliminated and where the die itself is continually self-compensated within a limited range of the extruding apparatus.

In effect, the design of the present sheeting die advantageously incorporates into one unit the characteristics of at least two separate dies wherein the feed to the die lip is uniformly had from opposing die ends, the plastic flowing from separate internal die passages into a common die passage forming the extruding die lip. Where plastic material is fed from equal opposing passages, it is advantageously self-compensating in that it overcomes the tendency of the material to more readily extrude at the die ends since both ends are being fed plastic material under the same pressure and conditions.

The advantages of the self-compensating die and of the die itself will be more specifically described in the following specification taken in conjunction with the accompanying drawings, where:

FIGURES 1, 2 and 3 are representative of an end mounted and fed standard sheet extrusion die that is commonly utilized;

FIGURE 4 represents diagrammatically, in cross section, the improved die of the invention showing the flow paths of the sheet forming material within the die;

FIGURE 5 further represents, in partial section, the flow paths of FIGURE 4 of the sheet forming material within the die; and FIGURES 6 and 7 show, in diagrammatic fashion, the compensating results of the die of the invention.

Referring to the drawings and FIGURES 1–3 inclusive, whenever end fed dies are utilized, the plastic material generally enters the die through an end as through conduit 10, into a channel 12 of the die 11 and, from the internal channel 12, into the narrowing die space 13 to be extruded by the die lips 14. The cavity 12, into which the plastic material is initially fed, may have a flow compensating configuration throughout its length to equalize the pressure of the plastic material entering the space 13 and therefrom into the die lips 14. Flow characteristics of the plastic material to be used must be compensated for in the design. They are generally built into the extruder die in order to produce a sheet that will issue squarely and uniformly in thickness across its width as shown in FIGURE 2. The sheet 15 desirably must have the same thickness characteristics throughout its width. However, should the extrusion conditions change as, for instance, the pressure increased, the plastic material will issue more quickly at the immediate point of extrusion nearest to the point of inflow from the conduit 10 being thicker there, then tapering off generally uniformly towards the far end of the die. The resulting plastic sheet will generally be as shown in FIGURE 3. More material will be extruded at the plastic entry end of the die and it will increase in thickness at that point to then be gradually thinned out towards the far end of the die. Any change then in increase of extrusion pressure outside of the original governing conditions will cause end effects such as described and, generally, irrespectively of any additional means, as choker bars, in the die itself that may be used for pressure correction. Where such means are used, readjustments have to be effected consuming time and also resulting in loss of material because of inequalities.

Advantageously, the die of FIGURES 4 and 5 inherently and automatically will compensate for variations in pressure up to a limit of the extruding apparatus utilizing such die. As shown in FIGURE 4, plastic material entering the die 21 through conduit 20 enters a first generally circular channel 25 which extends throughout the width of the die and therefrom in divided form through oppositely end positioned diverging channels 26 and 27 into further separated channels 28 and 29. Each channel 28 and 29 is end fed so that plastic material entering that portion of the die has the tendency to fill and flow out of such end portions immediately to provide the sheet ends of equal thickness. However, from the channels 28 and 29, the plastic material is directed by narrowing individual side-length passages 30, 31 through their convergence into a single passage 33 formed by the die lips 22, the material issuing as a single uniform sheet 35.

The flow is further and more specifically shown in FIGURE 5 where the plastic material in conduit 20 is fed centrally of the width of the die 21 into the first cylindrical channel or chamber 25 thence through one side passage 27 into a lower chamber 29, through another oppositely positioned side or end passage 26 into a second lower chamber 28, thence out of each chamber through respectively associated divergent passages 30, 31. These, then, emerge into the single passage 33 formed by the die lips 22. As the material flows out of each separate chamber 28 and 29, the pressures are being oppositely equalized as the material flows therefrom through the pressure equalizing divergent passages 30, 31 into the single outflow passage 33 as a compensated sheet. The material emerging from the die lips is desirably under uniform pressure and generally uniformly thick across its entire width.

In effect, what occurs is that two end fed dies are superimposed on each other as shown in FIGURE 6. The material in each end, when alone under increased pressure, would tend to build up thicker sheet at the nearest immediate extrusion point. Since two dies are so employed and from opposite positions, the tendency would then be to have a thickened sheet starting at each end. However, since the flow of the two end fed passages is combined, there occurs an offset or a self-compensating effect to provide a more uniform issuing pressure through the die lips. This is further corrected by the flow of plastic, as from each die, into a final common issuing passage just prior to and formed by the die lips. An increase in extrusion pressure by a feeding worm, ram, or other method will not affect the uniformity of an extruded sheet, the die is continually self-compensating.

What is claimed is:

1. The method for equalizing extruding pressure of a thermoplastic material issuing in sheet form from an extruding die comprising, admitting said material into said die at about the midpoint of an elongated chamber, splitting the flow therefrom into opposing ends of each of at least two separate generally coextensive chambers, exhausting said material from each of said chambers through generally coextensive side outlet passages, combining the flows from said passages and extruding the combined flows as one.

2. In a die for extruding thermoplastic material into sheet, a centrally positioned inlet for said material, a laterally extending first chamber receiving said material at about its midpoint, opposing end outlet passages for said material from said chamber, secondary transversely spaced dual material receiving and forwarding chambers each receiving said material through opposing ends, side outlet passages from each of said dual chambers, said side outlet passages converging to subsequently form a single extruding passage through the lips of the die.

3. In a die for extruding thermoplastic material into sheet, a centrally positioned inlet receiving said material, a laterally extending chamber joined to said inlet, a first chamber for receiving said material being in length about equal to the die width, opposing end outlet passages from said chamber to connecting secondary dual material receiving and forwarding chambers, said dual chambers being coextensive and about equal to the die width, passages from each of said dual chambers, said passages being coextensive side outlets from said dual chambers, said outlets converging to subsequently form a single extruding passage through the lips of the die.

References Cited by the Examiner

FOREIGN PATENTS

| | | |
|---|---|---|
| 246,256 | 8/1963 | Australia. |
| 572,082 | 3/1959 | Canada. |
| 752,276 | 10/1956 | Great Britain. |

ALEXANDER H. BRODMERKEL, *Primary Examiner.*

ROBERT F. WHITE, *Examiner.*

J. H. WOO, *Assistant Examiner.*